United States Patent

Griesenbrock

[15] 3,672,167

[45] June 27, 1972

[54] HYDROSTATIC VEHICLE TRANSMISSION

[72] Inventor: Karl-Heinz Griesenbrock, Duisburg, Germany

[73] Assignee: Eaton Yale & Towne GmbH, Velbert/Rhineland, Germany

[22] Filed: Nov. 20, 1970

[21] Appl. No.: 91,270

[30] Foreign Application Priority Data

Nov. 21, 1969    Germany .................. P 19 58 436.2

[52] U.S. Cl. ............................................. 60/53 R, 180/66
[51] Int. Cl. .......................................................... F16d 31/06
[58] Field of Search ............................. 60/53 R, 19; 180/66

[56] References Cited

UNITED STATES PATENTS

| | | | |
|---|---|---|---|
| 3,402,549 | 9/1968 | Connett et al. | 60/53 R |
| 3,129,781 | 4/1964 | Stein | 60/53 X |
| 3,153,900 | 10/1964 | Pigeroulet et al. | 60/53 R |
| 3,153,911 | 10/1964 | Mark et al. | 60/53 X |
| 3,187,497 | 6/1965 | Granryd | 60/53 R |
| 3,188,996 | 6/1965 | Thompson | 60/53 X |
| 3,405,776 | 10/1968 | Hertell | 60/53 R |
| 3,581,498 | 6/1971 | Cudnohufsky | 60/53 R |
| 3,543,508 | 12/1970 | Schwab | 60/19 |
| 3,383,857 | 5/1968 | Rajchel | 60/53 |
| 3,217,493 | 11/1965 | Kempson et al. | 60/53 |

FOREIGN PATENTS OR APPLICATIONS

1,424,040   11/1965   France .................................... 60/53

*Primary Examiner*—Martin P. Schwadron
*Assistant Examiner*—Leslie J. Payne
*Attorney*—Teagno & Toddy

[57] ABSTRACT

The invention relates to a hydrostatic vehicle transmission having a closed symmetrical circuit and a variable displacement pump with a reversible direction of delivery, and having an anti-pressure-build-up device, by means of which the pressure in the line carrying pressure fluid from the hydraulic motor to the pump is released when, under particular travel conditions, especially during deceleration of the vehicle, the motor acts as pump and vice versa.

5 Claims, 3 Drawing Figures

INVENTOR.
KARL-HEINZ GRIESENBROCK
BY
TEAGNO & TODDY
ATTORNEYS

HYDROSTATIC VEHICLE TRANSMISSION

In vehicle transmissions, a reversal of the power flow must be taken into account, i.e. within the range of displacement, the hydraulic pump acts as a hydraulic motor or it stops the flow of pressure fluid in the neutral position and the hydromotor acts as hydropump, the high-pressure and low-pressure sides of the pump and the motor being reversed accordingly. Such reversals of the power flow or changes of the pressure sides occur in vehicle transmissions of this type when, after a period of acceleration and unaccelerated travel, the vehicle is decelerated. This hydromotor acted upon by the wheels of the vehicle is then driven by the vehicle wheels and thus acts as a hydropump, while the hydropump proper acts as a hydromotor until the neutral position is reached. As soon as the neutral position is reached, the further increasing operating pressure is only limited by the safety valves set at the maximum operating pressure.

If, as is usual in automotive applications, the hydropump is forced back into the neutral position, e.g. by return springs, upon removal of the force effecting the displacement, the above described reversal of the power flow will, due to the increasing throttle effect the hydraulic pump, result in an uncontrollable and, under certain circumstances, very strong and jerky deceleration of the vehicle. This may of course involve considerable hazards, especially in the case of load handling vehicles such as fork lift trucks or the like, where such a sudden deceleration may cause a load to fall down and involve the risk of an injury or damage. The vehicle transmission shown in U.S. Pat. No. 3,217,493 uses a mechanically controlled multiway valve with a central lap position which, depending on the selected travel direction, alternatively connects one of the two lines between the hydropump and the hydromotor to a connection line between these two lines which is provided with two check valves so that, in the event of pressure buildup being caused by a deceleration of the vehicle, the pressure is released via one of the check valves toward the low-pressure side. The partly exposed mechanical control elements of the multiway valve are likely to become contaminated in certain operating conditions and therefore do not guarantee safe operation. However, a special disadvantage of this transmission is that high-pressure sealed valve plungers have to be used in order to avoid leakage, whose operation requires substantial physical effort. This is especially disadvantageous because operation of the pressure relief valve plunger has to occur simultaneously with the selection of the travel direction. A further disadvantage of this device consists in the central lap position of the multiway valve. As the neutral position of a hydropump is in practice not exactly adjustable, even a small displacement will cause the hydropump to build up an operating pressure and consequently, a stationary vehicle with the engine running will start to inch forward or backward. Finally, the device is ineffective and thus highly hazardous if the travel direction is reversed while the vehicle is moving.

It is the purpose of this invention to find a solution that avoids the disadvantages described above, and which operates automatically.

In a hydrostatic vehicle transmission of this invention an anti-pressure-build-up device is provided with one control valve in each main line between the pump and the motor. The two control valves shortcircuit both the pump and the motor in the rest position and in the neutral position of the pump, via a connection line provided between the two control valves. Thus if the movement of the pump out of the neutral position exceeds a certain degree in the one or the other direction of delivery, and consequently a pressure is built up, the control valve in the pressure side will interrupt and shortcircuit the pressure fluid from the pump to the motor and from there back to the pump via the other control valve. The control valve will return to the rest position when the pressure sides are reversed or the pressure on the respective pressure side is released.

It will be appreciated that due to this configuration, in the event of a sudden reversal of the pressure sides, the pressure in the line that carries pressure fluid from the hydromotor to the hydropump will be released automatically when, depending upon certain travel conditions, especially in the event of deceleration of the vehicle, the hydromotor acts as pump and the pump acts as hydromotor or the hydropump has no absorption capacity in the neutral position. Furthermore, it is of special advantage that the device can easily be arranged in such manner that near the neutral position of the pump a buildup of operating pressure by the pump is avoided so that a stationary vehicle with the engine running will not inch out of position.

A simple and safe construction is achieved by providing each control valve with a control plunger, which, in its spring-adjusted rest position, opens a passage which is connected to the connection line and which, at a small deviation of the pump from the neutral position and a consequent buildup of operating pressure, closes this passage.

Each control plunger is acted upon by the pressure fluid coming from the pump, and is provided with a line having a small cross sectional area so that at a small deviation of the pump from the neutral position, a small amount of pressure fluid can pass into the short circuit through the passages and the connection line, without the control plunger being moved out of its rest position. Due to this configuration, the hydromotor, at a small deviation of the pump from its neutral position, is not acted upon by the pressure fluid, so that an undesirable inching of the vehicle out of its position will not occur. Due to the simultaneous shortcircuiting of the hydromotor, the tractive power of the vehicle is not impaired.

The admission of pressure fluid to the control plunger can be effected via a pilot line that branches off from the line coming from the pump, and via a check valve provided in the control plunger the return flow of pressure fluid from the motor to the pump is effected in the event the control valve is in the rest position.

As is usually the case, a feed pump is driven together with the hydraulic pump, which upon demand delivers fluid via check valves into the main lines between the motor and the control valves. Preferably, the feed pressure is conveyed to a pressure chamber in the control valves, which coacts with that side of the control plungers which is opposite to the side acted upon by the pressure fluid coming from the control plungers. Due to this configuration, which ensures that the control plunger is acted upon by feed pressure on both sides, the spring holding the control plunger in the rest position can be of relatively small dimensions.

In the following, the invention is explained in further detail by reference to the drawings.

Figure 1:
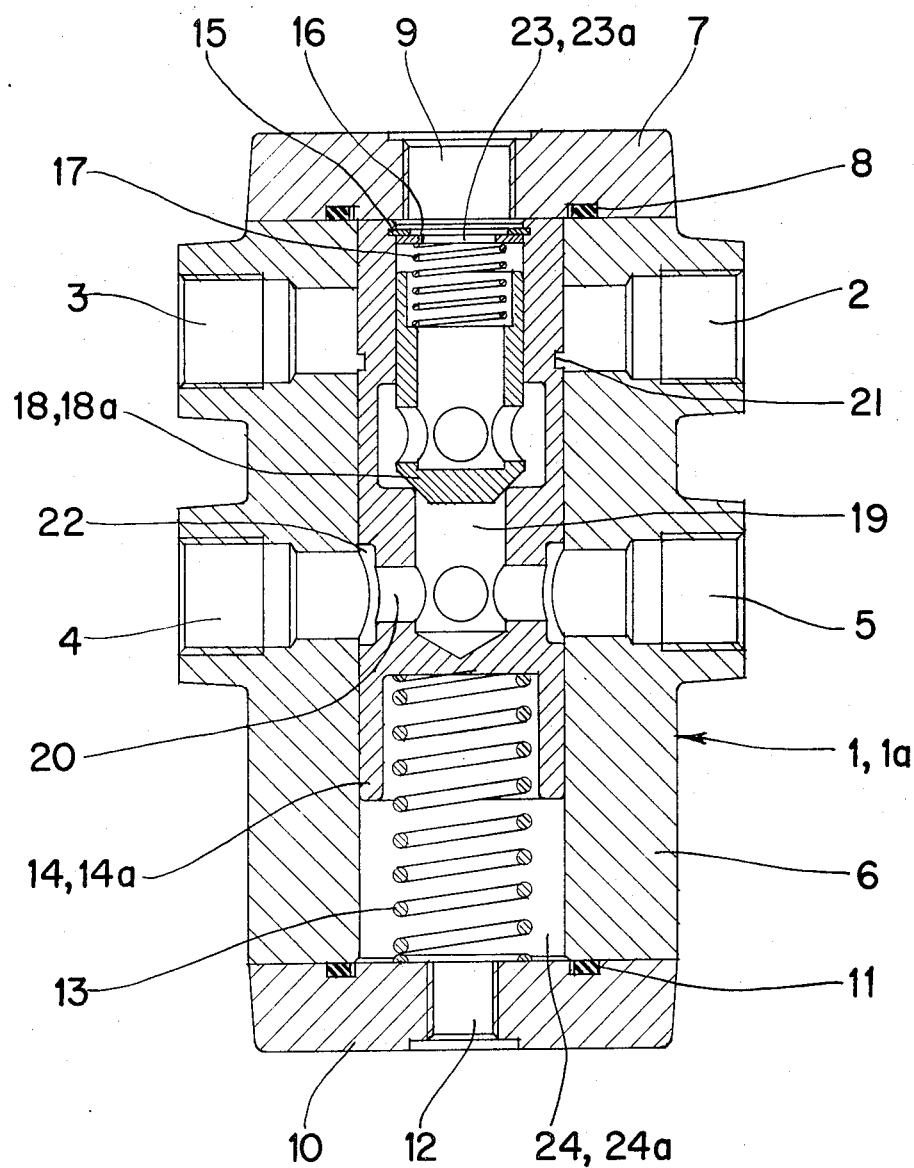
FIG. 1 is a longitudinal view of a control valve for a hydrostatic vehicle transmission according to the invention shown in released position.

Each of the control valves 1, 1a individually shown in FIG. 1 is provided with passages 2, 3, 4 and 5 in a housing 6, whose longitudinal bore is closed by means of a top cover 7 having a seal 8 and a control pilot connection 9. The cover 7 is connected to the housing in a suitable manner, not shown in the drawing. A bottom cover 10 having a seal 11 and a connection 12 is connected to the housing in a suitable manner not shown in the drawing. A slideable control plunger 14 is arranged in the internal bore of the housing 6 and is loaded by a return spring 13.

The control plungers 14, 14a for each valve is provided with a check valve 18, 18a, held by a retaining ring 15 and a disk 16 pre-loaded by a spring 17, as well as with passages 19 and 20 and ring-shaped grooves 21 and 22.

Between the top cover 7 and the bottom cover 10 on the one hand and between the two opposite sides of each control plunger on the other hand, pressure chambers 23 and 24 are provided, which are in connection with the pilot connections 9 and 12.

Figure 2:
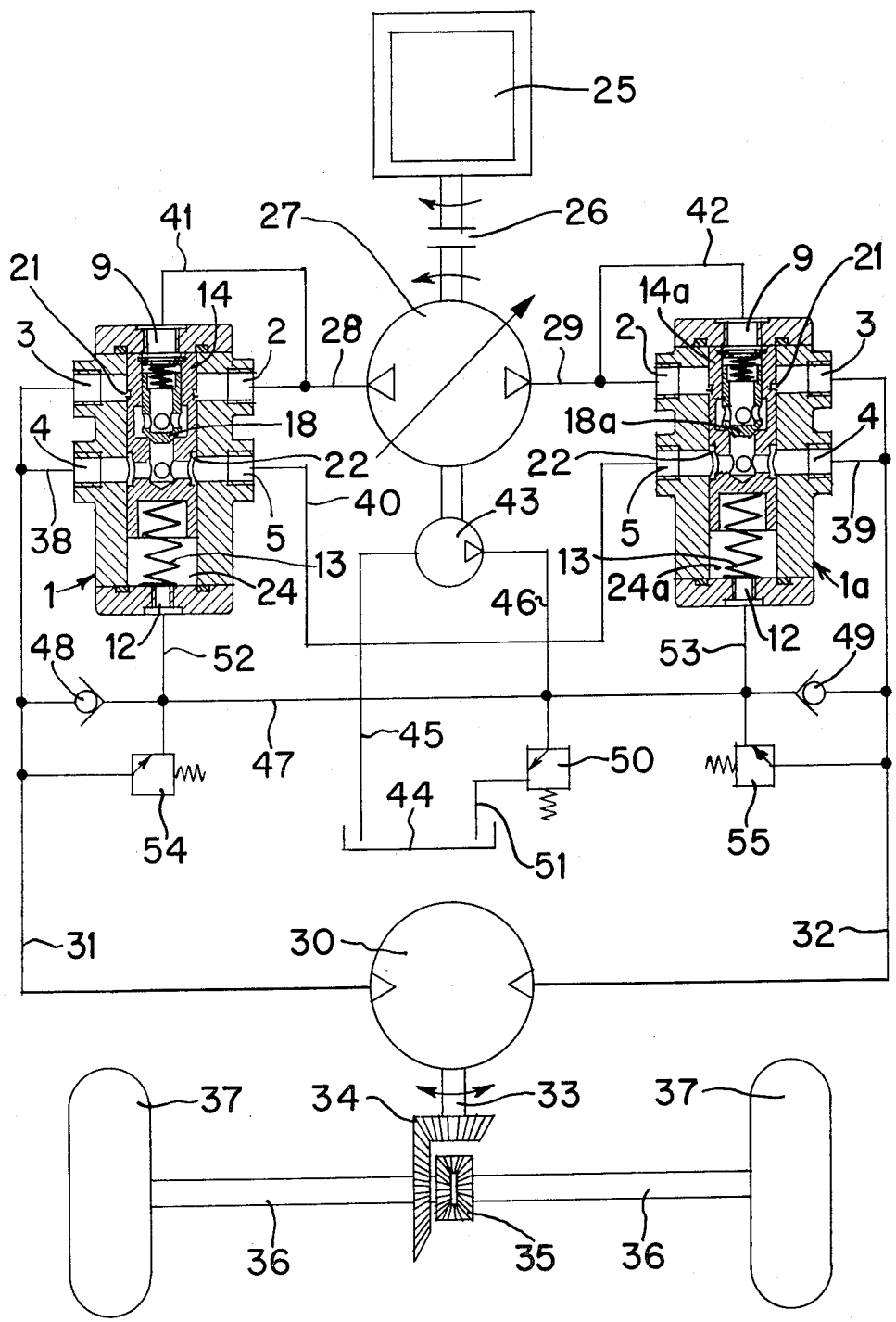
FIG. 2 is a schematic drawing of a hydrostatic vehicle transmission according to the invention shown in released or rest position.

As shown in FIG. 2, each control valve is incorporated into a hydrostatic vehicle transmission with a closed, symmetrical circuit. A drive engine 25 which is generally an internal combustion engine, drives, via a non-disengageable coupling 26, a variable displacement hydropump 27 with a reversible direction of delivery. Lines 28 and 29 connect the hydropump 27 with the passages 2 of each of the two control valves 1, 1a, to whose passages 3 a hydromotor 30 is connected via lines 31 and 32. The hydromotor acts upon the drive wheels via a drive shaft 33, a bevel gearing 34, a differential gearing 35 and axles 36.

The lines 31 and 32 are connected by lines 38 and 39 to the passage 4 of the control valves 1, 1a which, in turn, are connected to each other via a line 40 connecting the passages 5. The pump 27 is connected to the pilot connection 9 of the control valves 1, 1a via pilot lines 41 and 42 starting from the lines 28 and 29.

A feed pump 43 which is driven by the hydropump 27 and is connected by a suction line 45 to an oil sump 44 and by lines 46 and 47 to the check valves 48 and 49, which lead to the main lines 31 and 32. The line 46 is connected to a pressure relief valve 50 for the feed circuit with a return line 51 leading to the sump 44. From the line 47, connection lines 52 and 53 branch off to the connections 12 of the control valves 1, 1a. In addition, safety valves 54 and 55 are installed between the connection lines 52 and 53 and the lines 31 and 32 respectively.

All parts of a hydrostatic transmission which are not relevant for the explanation of the invention, such as oil filter, oil cooler, etc., are not shown in the drawing.

The transmission functions in the following manner: If the drive engine 25 is running and the hydropump 27 has not yet moved out of the neutral position, the control valves 1, 1a are in released position or rest position as shown in FIG. 2. The feed pump 43 delivers pressure fluid from the sump 44 via the suction line 45 and via the lines 46 and 47 to the check valves 48 and 49, one of which open upon pressure fluid demand of the hydromotor 30 and/or the hydropump 27. Upon pressure fluid demand of the hydropump 27, one of the check valves 18 or 18a will also open. The pressure chambers 24 and 24a are acted upon by feed pressure via the lines 52 and 53. As the feed pressure acts upon the control plungers 14 and 14a they are held by the return springs 13 in the upper position shown in FIG. 2.

If the hydropump 27 is not exactly in the neutral position, the small fluid volume, no matter of which direction of delivery, is moved without pressure through the lines 28 and 29, the passages 2 and 3, the ring-shaped grooves 21, the upper portions of lines 31 and 32, the lines 38 and 39, the passages 4 and 5, the ring-shaped grooves 22 and the line 40. The hydromotor 30 is thus not acted upon by pressure. The motor 30 is short-circuited via the upper portions of lines 31 and 32, lines 38 and 39, the passages 4 and 5, the ring-shaped grooves 22 and line 40. This guarantees that the tractive power of the vehicle is maintained.

Figure 3:
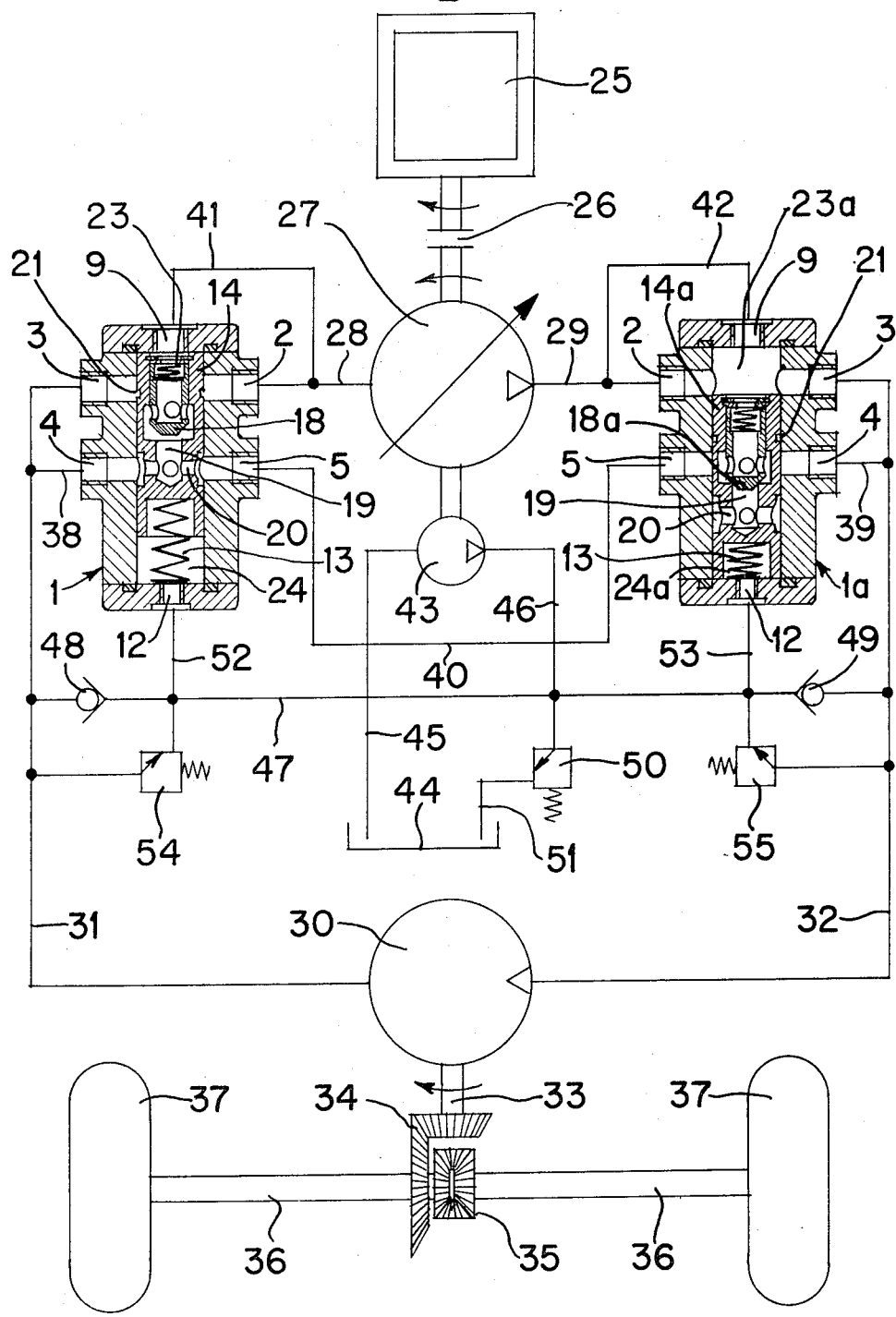
FIG. 3 shows the transmission according to FIG. 2 in operative position for one travel direction.

If the displacement of the pump 27 increases in one of the two travel directions, the narrow ring-shaped groove 21 of the control valve related to that travel direction, e.g. control valve 1a, effects an increase of pressure in line 29 caused by the throttle effect and consequently, also in the pressure chamber 23a via pilot line 42. The increased pressure in the pressure chamber 23a acts on the control plunger 14a and moves it against the force of the return spring 13 into the lower end position, as shown in FIG. 3. The passages 2 and 3 are then open while the passages 4 and 5 are closed. Due to this pressure increase, the check valve 18a is sealed. The hydromotor 30 is then acted upon by pressure fluid from the passage 3 via the line 32.

The return to the hydropump 27 on the low-pressure side of the circuit will be effected via line 31 and 38, through passage 4, passages 20 and 19, check valve 18, pilot line 41 and line 28. The high-pressure side, which has been formed for this direction of travel, is protected by the safety valve 55. The demand for feed pressure on the low-pressure side is effected by the check valve 48.

If, after a period of acceleration and unaccelerated travel, the vehicle is decelerated, i.e. the hydromotor 30 is driven by the drive wheels 37 via the axles 36, the differential gear 35, the bevel gearing 34 and the drive shaft 33, the pressure sides will reverse. During this process, the control valve 1 remains in the released position but the reversal of pressure causes the control valve 1a to return to the released position as shown in FIG. 2, whereby the hydropump 27 and the hydromotor 30 are again relieved of pressure as illustrated in FIG. 2 by short circuiting the motor 30 via line 40.

For the other travel direction the function is the same, with the sides of the circuit being exchanged.

The embodiment shown here can of course be varied in many ways without deviating from the basic idea of the invention. For example, the above described control valve could be designed with the control plunger of the valve not being acted upon by pressure on both sides. The design here shown is however especially simple and advantageous for the reasons stated above. It is of particular importance that the control valves be arranged in the main lines between the hydropump and the hydromotor in such a manner that, in the event of a sudden reversal of the pressure sides, the pressure in the line between the hydromotor and the hydropump is automatically released. The arrangement must of course be such that, if the deviation of the pump from the neutral position exceeds a certain degree, the closed circuit between the hydropump and the hydromotor is established.

I now claim:

1. Hydrostatic vehicle transmission having a closed, symmetrical circuit, a variable displacement hydraulic pump with a reversible direction of delivery, a fixed displacement hydrostatic motor and having an anti-pressure build-up device, by means of which the pressure in the line carrying short-circuit fluid from the hydraulic motor to the pump is released when, under particular travel conditions, especially during deceleration of the vehicle, the motor acts as a pump and vice versa, comprising a first control valve in the main line between the high pressure outlet of the pump and the high pressure inlet of the motor, a second control valve between the low pressure outlet of the motor and the low pressure inlet of the pump, said valves connected in such a manner that the control valves will, in their rest position and in the neutral position of the pump, short-circuit the pump from the motor via a connection line between the two control valves, means in each of said valves for interrupting the short circuit when the pump is moved a certain amount out of its neutral position and pressure is built up as a result thereof and for reconnecting the short circuit as soon as the pressure sides have been reversed or the pressure on the pressure side has been released.

2. Vehicle transmission according to claim 1 in which each of said control valves is provided with a control plunger which, in its spring adjusted rest position, opens a port connected to the connection line and which closes this port when the pump is moved out of the neutral position and a certain pressure is built up as a result thereof.

3. Vehicle transmission according to claim 2 having a feed pump driven together with the hydraulic pump, which delivers pressure fluid into the main lines between the motor and the control valves via check valves, the feed pressure acting upon a pressure chamber of the control valves which coacts with that side of the control plungers which is opposite to the side of the control plunger that is acted upon by the pressure fluid coming from the pump.

4. Hydrostatic vehicle transmission having a closed, symmetrical circuit and a variable displacement hydraulic pump with a reversible direction of delivery, and having an anti-pressure build-up device, by means of which the pressure in the line carrying pressure fluid from the hydraulic motor to the pump is released when, under particular travel conditions, especially during deceleration of the vehicle, the motor acts as a pump and vice versa, comprising a control valve in each main line between the pump and the motor connected in such a manner that the control valves will, in their rest position and in the neutral position of the pump, short-circuit both the pump and the motor via a connection line between the two control valves so that, if the pump is moved a certain amount out of its neutral position and pressure is built up as a result thereof, the control valve on the pressure side will interrupt the short circuit and deliver the pressure fluid from the pump to the motor and from there to the other control valve and return to the rest position as soon as the pressure sides have been reversed or the pressure on the pressure side has been released, each of said control valves being provided with a control plunger which in its spring adjusted rest position opens a port connected to said connection line and which closes said port when the pump is moved out of the neutral position and a certain pressure is built up as a result thereof, each of said plungers being acted upon by pressure fluid coming from the pump, each control plunger having a line of a small sectional area through which a small amount of pressure fluid can pass to the short circuit via said ports and the said connection line without the control plunger being moved out of its rest position when a small deviation of the pump from the neutral position occurs.

5. Hydrostatic vehicle transmission having a closed, symmetrical circuit and a variable displacement hydraulic pump with a reversible direction of delivery, and having an anti-pressure build-up device, by means of which the pressure in the line carrying pressure fluid from the hydraulic motor to the pump is released when, under particular travel conditions, especially during deceleration of the vehicle, the motor acts as a pump and vice versa, comprising a control valve in each main line between the pump and the motor connected in such a manner that the control valves will, in their rest position and in the neutral position of the pump, short-circuit both the pump and the motor via a connection line between the two control valves so that, if the pump is moved a certain amount out of its neutral position and pressure is built up as a result thereof, the control valve on the pressure side will interrupt the short circuit and deliver the pressure fluid from the pump to the motor and from there to the other control valve and return to the rest position as soon as the pressure sides have been reversed or the pressure on the pressure side has been released, each of said control valves being provided with a control plunger which in its spring adjusted rest position opens a port connected to said connection line and which closes said port when the pump is moved out of the neutral position and a certain pressure is built up as a result thereof, each of said plungers being acted upon by pressure fluid coming from the pump, the administration of pressure to the control plunger being effected via a pilot line branching off from the line that comes from the pump through which pilot line as well as through a check valve in the control plunger, fluid pressure returning from the motor to the pump when the control valve is in its rest position.

* * * * *